United States Patent
Endel et al.

(10) Patent No.: US 12,210,986 B2
(45) Date of Patent: *Jan. 28, 2025

(54) SPACE UTILIZATION PATTERNS FOR BUILDING OPTIMIZATION

(71) Applicant: Honeywell International Inc., Charlotte, NC (US)

(72) Inventors: Petr Endel, Prague (CZ); Ondrej Holub, Prague (CZ); Karel Marik, Revnice (CZ)

(73) Assignee: Honeywell International Inc., Charlotte, NC (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/122,984

(22) Filed: Mar. 17, 2023

(65) Prior Publication Data

US 2023/0222402 A1 Jul. 13, 2023

Related U.S. Application Data

(63) Continuation of application No. 16/900,394, filed on Jun. 12, 2020, now Pat. No. 11,620,594.

(51) Int. Cl.
*G06Q 10/063* (2023.01)
*F24F 11/56* (2018.01)
(Continued)

(52) U.S. Cl.
CPC ............ *G06Q 10/063* (2013.01); *F24F 11/56* (2018.01); *F24F 11/65* (2018.01); *G05B 15/02* (2013.01);
(Continued)

(58) Field of Classification Search
CPC .................................................. G06Q 10/0631
See application file for complete search history.

(56) References Cited

U.S. PATENT DOCUMENTS

| | | | |
|---|---|---|---|
| 191,512 | A | 6/1877 | Bennett et al. |
| 4,009,647 | A | 3/1977 | Howorth |

(Continued)

FOREIGN PATENT DOCUMENTS

| | | |
|---|---|---|
| CA | 2387100 A1 | 11/2003 |
| CA | 2538139 A1 | 3/2005 |

(Continued)

OTHER PUBLICATIONS

"Energy Manager User Guide," Release 3.2, Honeywell, 180 pages, 2008.

(Continued)

*Primary Examiner* — Nadja N Chong Cruz
*Assistant Examiner* — Nadja Chong
(74) *Attorney, Agent, or Firm* — Seager, Tufte & Wickhem, LLP

(57) ABSTRACT

Occupancy data over time is received for each of several spaces within a building from occupancy sensors that are disposed within each of the spaces. An occupancy value is determined for each of at least some of the several spaces based on the received occupancy data, each occupancy value representative of a percent of time that the respective space was occupied over an identified period of time. The space that had a highest occupancy value over the identified period of time is identified. A utilization value is determined for each of the spaces, wherein the utilization value is representative of a ratio of the occupancy value of the respective space and the highest occupancy value. An operation of the building is changed based at least in part on the utilization value of at least one of the plurality of spaces.

18 Claims, 5 Drawing Sheets

(51) Int. Cl.
*F24F 11/65* (2018.01)
*G05B 15/02* (2006.01)
*G05B 19/042* (2006.01)
*G06F 17/11* (2006.01)
*G06Q 10/0631* (2023.01)

(52) U.S. Cl.
CPC ............ *G05B 19/042* (2013.01); *G06F 17/11* (2013.01); *G06Q 10/0631* (2013.01); *G06Q 10/06312* (2013.01)

(56) References Cited

U.S. PATENT DOCUMENTS

| | | |
|---|---|---|
| 4,375,637 A | 3/1983 | Desjardins |
| 4,918,615 A | 4/1990 | Suzuki et al. |
| 4,939,922 A | 7/1990 | Smalley et al. |
| 5,566,084 A | 10/1996 | Cmar |
| 5,727,579 A | 3/1998 | Chardack |
| 5,745,126 A | 4/1998 | Jain et al. |
| 5,751,916 A | 5/1998 | Kon et al. |
| 5,777,598 A | 7/1998 | Gowda et al. |
| 5,973,662 A | 10/1999 | Singers et al. |
| 6,065,842 A | 5/2000 | Fink |
| 6,139,177 A | 10/2000 | Venkatraman et al. |
| 6,144,993 A | 11/2000 | Fukunaga et al. |
| 6,157,943 A | 12/2000 | Meyer |
| 6,229,429 B1 | 5/2001 | Horon |
| 6,238,337 B1 | 5/2001 | Kambhatla et al. |
| 6,334,211 B1 | 12/2001 | Kojima et al. |
| 6,353,853 B1 | 3/2002 | Gravlin |
| 6,369,695 B2 | 4/2002 | Horon |
| 6,375,038 B1 | 4/2002 | Daansen et al. |
| 6,429,868 B1 | 8/2002 | Dehner, Jr. et al. |
| 6,473,084 B1 | 10/2002 | Phillips et al. |
| 6,487,457 B1 | 11/2002 | Hull et al. |
| 6,580,950 B1 | 6/2003 | Johnson et al. |
| 6,598,056 B1 | 7/2003 | Hull et al. |
| 6,619,555 B2 | 9/2003 | Rosen |
| 6,704,012 B1 | 3/2004 | Lefave |
| 6,720,874 B2 | 4/2004 | Fufido et al. |
| 6,741,915 B2 | 5/2004 | Poth |
| 6,796,896 B2 | 9/2004 | Laiti |
| 6,801,199 B1 | 10/2004 | Wallman |
| 6,816,878 B1 | 11/2004 | Zimmers et al. |
| 6,876,951 B2 | 4/2005 | Skidmore et al. |
| 6,882,278 B2 | 4/2005 | Winings et al. |
| 6,904,385 B1 | 6/2005 | Budike, Jr. |
| 6,907,387 B1 | 6/2005 | Reardon |
| 6,911,177 B2 | 6/2005 | Deal |
| 6,993,403 B1 | 1/2006 | Dadebo et al. |
| 6,993,417 B2 | 1/2006 | Osann, Jr. |
| 7,023,440 B1 | 4/2006 | Havekost et al. |
| 7,031,880 B1 | 4/2006 | Seem et al. |
| 7,062,722 B1 | 6/2006 | Carlin et al. |
| 7,110,843 B2 | 9/2006 | Pagnano et al. |
| 7,139,685 B2 | 11/2006 | Bascle et al. |
| 7,164,972 B2 | 1/2007 | Imhof et al. |
| 7,183,899 B2 | 2/2007 | Behnke |
| 7,200,639 B1 | 4/2007 | Yoshida |
| 7,222,111 B1 | 5/2007 | Budike, Jr. |
| 7,222,800 B2 | 5/2007 | Wruck |
| 7,257,397 B2 | 8/2007 | Shamoon et al. |
| 7,280,030 B1 | 10/2007 | Monaco |
| 7,292,908 B2 | 11/2007 | Borne et al. |
| 7,295,116 B2 | 11/2007 | Kumar et al. |
| 7,302,313 B2 | 11/2007 | Sharp et al. |
| 7,308,323 B2 | 12/2007 | Kruk et al. |
| 7,308,388 B2 | 12/2007 | Beverina et al. |
| 7,313,447 B2 | 12/2007 | Hsiung et al. |
| 7,346,433 B2 | 3/2008 | Budike, Jr. |
| 7,356,548 B1 | 4/2008 | Culp et al. |
| 7,379,782 B1 | 5/2008 | Cocco |
| 7,383,148 B2 | 6/2008 | Ahmed |
| 7,434,742 B2 | 10/2008 | Mueller et al. |
| 7,447,333 B1 | 11/2008 | Masticola et al. |
| 7,466,224 B2 | 12/2008 | Ward et al. |
| 7,496,472 B2 | 2/2009 | Seem |
| 7,512,450 B2 | 3/2009 | Ahmed |
| 7,516,490 B2 | 4/2009 | Riordan et al. |
| 7,548,833 B2 | 6/2009 | Ahmed |
| 7,551,092 B1 | 6/2009 | Henry |
| 7,557,729 B2 | 7/2009 | Hubbard et al. |
| 7,567,844 B2 | 7/2009 | Thomas et al. |
| 7,596,473 B2 | 9/2009 | Hansen et al. |
| 7,610,910 B2 | 11/2009 | Ahmed |
| 7,626,507 B2 | 12/2009 | LaCasse |
| 7,664,574 B2 | 2/2010 | Imhof et al. |
| 7,682,464 B2 | 3/2010 | Glenn et al. |
| 7,702,421 B2 | 4/2010 | Sullivan et al. |
| 7,729,882 B2 | 6/2010 | Seem |
| 7,755,494 B2 | 7/2010 | Melker et al. |
| 7,761,310 B2 | 7/2010 | Rodgers |
| 7,774,227 B2 | 8/2010 | Srivastava |
| 7,797,188 B2 | 9/2010 | Srivastava |
| 7,819,136 B1 | 10/2010 | Eddy |
| 7,822,806 B2 | 10/2010 | Frank et al. |
| 7,856,370 B2 | 12/2010 | Katta et al. |
| 7,978,083 B2 | 7/2011 | Melker et al. |
| 7,984,384 B2 | 7/2011 | Chaudhri et al. |
| 7,986,323 B2 | 7/2011 | Kobayashi et al. |
| 8,024,666 B2 | 9/2011 | Thompson |
| 8,086,047 B2 | 12/2011 | Penke et al. |
| 8,099,178 B2 | 1/2012 | Mairs et al. |
| 8,151,280 B2 | 4/2012 | Sather et al. |
| 8,176,095 B2 | 5/2012 | Murray et al. |
| 8,218,871 B2 | 7/2012 | Angell et al. |
| 8,219,660 B2 | 7/2012 | McCoy et al. |
| 8,271,941 B2 | 9/2012 | Zhang et al. |
| 8,294,585 B2 | 10/2012 | Barnhill |
| 8,302,020 B2 | 10/2012 | Louch et al. |
| 8,320,634 B2 | 11/2012 | Deutsch |
| 8,334,422 B2 | 12/2012 | Gutsol et al. |
| 8,344,893 B1 | 1/2013 | Drammeh |
| 8,375,118 B2 | 2/2013 | Hao et al. |
| 8,476,590 B2 | 7/2013 | Stratmann et al. |
| 8,516,016 B2 | 8/2013 | Park et al. |
| 8,558,660 B2 | 10/2013 | Nix et al. |
| 8,639,527 B2 | 1/2014 | Rensvold et al. |
| 8,698,637 B2 | 4/2014 | Raichman |
| 8,816,860 B2 | 8/2014 | Ophardt et al. |
| 8,869,027 B2 | 10/2014 | Louch et al. |
| 8,904,497 B2 | 12/2014 | Hsieh |
| 8,936,944 B2 | 1/2015 | Peltz et al. |
| 8,947,437 B2 | 2/2015 | Garr et al. |
| 8,950,019 B2 | 2/2015 | Loberger et al. |
| 9,000,926 B2 | 4/2015 | Hollock et al. |
| 9,030,325 B2 | 5/2015 | Taneff |
| 9,098,738 B2 | 8/2015 | Bilet et al. |
| 9,105,071 B2 | 8/2015 | Fletcher et al. |
| 9,175,356 B2 | 11/2015 | Peltz et al. |
| 9,240,111 B2 | 1/2016 | Scott et al. |
| 9,280,884 B1 | 3/2016 | Schultz et al. |
| 9,292,972 B2 | 3/2016 | Hailemariam et al. |
| 9,320,662 B2 | 4/2016 | Hayes et al. |
| 9,370,600 B1 | 6/2016 | DuPuis et al. |
| 9,373,242 B1 | 6/2016 | Conrad et al. |
| 9,396,638 B2 | 7/2016 | Wildman et al. |
| 9,311,807 B2 | 8/2016 | Schultz et al. |
| 9,406,212 B2 | 8/2016 | De Luca et al. |
| 9,418,535 B1 | 8/2016 | Felch et al. |
| 9,418,536 B1 | 8/2016 | Felch et al. |
| 9,449,219 B2 | 9/2016 | Bilet et al. |
| 9,477,543 B2 | 10/2016 | Henley et al. |
| 9,497,832 B2 | 11/2016 | Verberkt et al. |
| 9,513,364 B2 | 12/2016 | Hall et al. |
| 9,526,380 B2 | 12/2016 | Hamilton et al. |
| 9,526,806 B2 | 12/2016 | Park et al. |
| 9,536,415 B2 | 1/2017 | De Luca et al. |
| 9,558,648 B2 | 1/2017 | Douglas |
| 9,591,267 B2 | 3/2017 | Lipton et al. |
| 9,613,518 B2 | 4/2017 | Dunn et al. |
| 9,618,224 B2 | 4/2017 | Emmons et al. |
| 9,640,059 B2 | 5/2017 | Hyland |
| 9,672,360 B2 | 6/2017 | Barkan |

(56) References Cited

U.S. PATENT DOCUMENTS

| | | |
|---|---|---|
| 9,710,700 B2 | 7/2017 | Bilet et al. |
| 9,715,242 B2 | 7/2017 | Pillai et al. |
| 9,721,452 B2 | 8/2017 | Felch et al. |
| 9,729,945 B2 | 8/2017 | Schultz et al. |
| 9,784,464 B2 | 10/2017 | Yamamoto et al. |
| 9,842,129 B2 | 12/2017 | Hatami-Hanza |
| 9,843,743 B2 | 12/2017 | Lewis et al. |
| 9,856,634 B2 | 1/2018 | Rodenbeck et al. |
| 9,872,088 B2 | 1/2018 | Fadell et al. |
| 9,875,639 B2 | 1/2018 | Bone et al. |
| 9,911,312 B2 | 3/2018 | Wildman et al. |
| 9,940,819 B2 | 4/2018 | Ferniany |
| 9,956,306 B2 | 5/2018 | Brais et al. |
| 9,986,175 B2 | 5/2018 | Frank et al. |
| 10,031,494 B2 | 7/2018 | Holaso |
| 10,087,608 B2 | 10/2018 | Dobizl et al. |
| 10,120,397 B1 | 11/2018 | Zakhor et al. |
| 10,222,767 B2 | 3/2019 | Holaso et al. |
| 10,223,894 B2 | 3/2019 | Raichman |
| 10,228,837 B2 | 3/2019 | Hua et al. |
| 10,235,865 B2 | 3/2019 | Thyroff |
| 10,251,610 B2 | 4/2019 | Parthasarathy et al. |
| 10,303,843 B2 | 5/2019 | Bitran et al. |
| 10,332,043 B2 | 6/2019 | Nair et al. |
| 10,332,382 B2 | 6/2019 | Thyroff |
| 10,514,817 B2 | 12/2019 | Hua et al. |
| 10,565,844 B2 | 2/2020 | Pourmohammad et al. |
| 10,602,474 B2 | 3/2020 | Goldstein |
| 10,607,147 B2 | 3/2020 | Raykov et al. |
| 10,845,082 B2 | 11/2020 | Endel et al. |
| 10,871,300 B2 | 12/2020 | Endel et al. |
| 2002/0111698 A1 | 8/2002 | Graziano et al. |
| 2002/0130868 A1 | 9/2002 | Smith |
| 2003/0028269 A1 | 2/2003 | Spriggs et al. |
| 2003/0030637 A1 | 2/2003 | Grinstein et al. |
| 2003/0046862 A1 | 3/2003 | Wolf et al. |
| 2003/0071814 A1 | 4/2003 | Jou et al. |
| 2003/0078677 A1 | 4/2003 | Hull et al. |
| 2003/0083957 A1 | 5/2003 | Olefson |
| 2003/0103075 A1 | 6/2003 | Rosselot |
| 2003/0171851 A1 | 9/2003 | Brickfield et al. |
| 2003/0214400 A1 | 11/2003 | Mizutani et al. |
| 2003/0233432 A1 | 12/2003 | Davis et al. |
| 2004/0001009 A1 | 1/2004 | Winings et al. |
| 2004/0064260 A1 | 4/2004 | Padmanabhan et al. |
| 2004/0143474 A1 | 7/2004 | Haeberle et al. |
| 2004/0153437 A1 | 8/2004 | Buchan |
| 2004/0168115 A1 | 8/2004 | Bauernschmidt et al. |
| 2004/0233192 A1 | 11/2004 | Hopper |
| 2004/0260411 A1 | 12/2004 | Cannon |
| 2005/0010460 A1 | 1/2005 | Mizoguchi et al. |
| 2005/0119767 A1 | 6/2005 | Kiwimagi et al. |
| 2005/0143863 A1 | 6/2005 | Ruane et al. |
| 2005/0267900 A1 | 12/2005 | Ahmed et al. |
| 2006/0004841 A1 | 1/2006 | Jeikkonen et al. |
| 2006/0009862 A1 | 1/2006 | Imhof et al. |
| 2006/0017547 A1 | 1/2006 | Buckingham et al. |
| 2006/0020177 A1 | 1/2006 | Seo et al. |
| 2006/0028471 A1 | 2/2006 | Kincaid et al. |
| 2006/0029256 A1 | 2/2006 | Miyoshi et al. |
| 2006/0058900 A1 | 3/2006 | Johanson et al. |
| 2006/0067545 A1 | 3/2006 | Lewis et al. |
| 2006/0067546 A1 | 3/2006 | Lewis et al. |
| 2006/0077255 A1 | 4/2006 | Cheng |
| 2006/0184326 A1 | 8/2006 | McNally et al. |
| 2006/0231568 A1 | 10/2006 | Lynn et al. |
| 2006/0265664 A1 | 11/2006 | Simons et al. |
| 2006/0279630 A1 | 12/2006 | Aggarwal et al. |
| 2007/0016955 A1 | 1/2007 | Goldberg et al. |
| 2007/0055757 A1 | 3/2007 | Mairs et al. |
| 2007/0055760 A1 | 3/2007 | McCoy et al. |
| 2007/0061046 A1 | 3/2007 | Mairs et al. |
| 2007/0067062 A1 | 3/2007 | Mairs et al. |
| 2007/0088534 A1 | 4/2007 | MacArthur et al. |
| 2007/0090951 A1 | 4/2007 | Chan et al. |
| 2007/0091091 A1 | 4/2007 | Gardiner et al. |
| 2007/0101433 A1 | 5/2007 | Louch et al. |
| 2007/0114295 A1 | 5/2007 | Jenkins |
| 2007/0120652 A1 | 5/2007 | Behnke |
| 2007/0139208 A1 | 6/2007 | Kates |
| 2007/0216682 A1 | 9/2007 | Navratil et al. |
| 2007/0219645 A1 | 9/2007 | Thomas et al. |
| 2007/0239484 A1 | 10/2007 | Arond et al. |
| 2007/0268122 A1 | 11/2007 | Kow et al. |
| 2008/0001763 A1 | 1/2008 | Raja et al. |
| 2008/0027885 A1 | 1/2008 | Van Putten et al. |
| 2008/0036593 A1 | 2/2008 | Rose-Pehrsson et al. |
| 2008/0062167 A1 | 3/2008 | Boggs et al. |
| 2008/0099045 A1 | 5/2008 | Glenn et al. |
| 2008/0103798 A1 | 5/2008 | Domenikos et al. |
| 2008/0120396 A1 | 5/2008 | Jayaram et al. |
| 2008/0144885 A1 | 6/2008 | Zucherman et al. |
| 2008/0183424 A1 | 7/2008 | Seem |
| 2008/0194009 A1 | 8/2008 | Marentis |
| 2008/0198231 A1 | 8/2008 | Ozdemir et al. |
| 2008/0209342 A1 | 8/2008 | Taylor et al. |
| 2008/0222565 A1 | 9/2008 | Taylor et al. |
| 2008/0224862 A1 | 9/2008 | Cirker |
| 2008/0242945 A1 | 10/2008 | Gugliotti et al. |
| 2008/0250800 A1 | 10/2008 | Wetzel |
| 2008/0279420 A1 | 11/2008 | Masticola et al. |
| 2008/0280275 A1 | 11/2008 | Collopy |
| 2008/0303658 A1 | 12/2008 | Melker et al. |
| 2008/0306985 A1 | 12/2008 | Murray et al. |
| 2008/0320552 A1 | 12/2008 | Kumar et al. |
| 2009/0001181 A1 | 1/2009 | Siddaramanna et al. |
| 2009/0024944 A1 | 1/2009 | Louch et al. |
| 2009/0065596 A1 | 3/2009 | Seem et al. |
| 2009/0083120 A1 | 3/2009 | Strichman et al. |
| 2009/0096791 A1 | 4/2009 | Abshear et al. |
| 2009/0125337 A1 | 5/2009 | Abri |
| 2009/0125825 A1 | 5/2009 | Rye et al. |
| 2009/0144023 A1 | 6/2009 | Seem |
| 2009/0157744 A1 | 6/2009 | McConnell |
| 2009/0160673 A1 | 6/2009 | Cirker |
| 2009/0193217 A1* | 7/2009 | Korecki ............... G06Q 10/087 |
| | | 711/170 |
| 2009/0322782 A1 | 12/2009 | Kimchi et al. |
| 2010/0048167 A1 | 2/2010 | Chow et al. |
| 2010/0058248 A1 | 3/2010 | Park |
| 2010/0064001 A1 | 3/2010 | Daily |
| 2010/0070089 A1 | 3/2010 | Harrod et al. |
| 2010/0073162 A1 | 3/2010 | Johnson et al. |
| 2010/0123560 A1 | 5/2010 | Nix et al. |
| 2010/0134296 A1 | 6/2010 | Hwang |
| 2010/0156628 A1 | 6/2010 | Ainsbury et al. |
| 2010/0156630 A1 | 6/2010 | Ainsbury |
| 2010/0188228 A1 | 7/2010 | Hyland |
| 2010/0223198 A1 | 9/2010 | Noureldin et al. |
| 2010/0235004 A1 | 9/2010 | Thind |
| 2010/0249955 A1 | 9/2010 | Sitton |
| 2010/0286937 A1 | 11/2010 | Hedley et al. |
| 2010/0318200 A1 | 12/2010 | Foslien et al. |
| 2010/0324962 A1 | 12/2010 | Nesler et al. |
| 2011/0010654 A1 | 1/2011 | Raymond et al. |
| 2011/0057799 A1 | 3/2011 | Taneff |
| 2011/0077779 A1 | 3/2011 | Fuller et al. |
| 2011/0083094 A1 | 4/2011 | Laycock et al. |
| 2011/0087988 A1 | 4/2011 | Ray et al. |
| 2011/0112854 A1 | 5/2011 | Koch et al. |
| 2011/0126111 A1 | 5/2011 | Gill et al. |
| 2011/0154426 A1 | 6/2011 | Doser et al. |
| 2011/0161124 A1 | 6/2011 | Lappinga et al. |
| 2011/0169646 A1 | 7/2011 | Raichman |
| 2011/0184563 A1 | 7/2011 | Foslien et al. |
| 2011/0202467 A1 | 8/2011 | Hilber et al. |
| 2011/0273298 A1 | 11/2011 | Snodgrass et al. |
| 2011/0291841 A1 | 12/2011 | Hollock et al. |
| 2011/0298301 A1 | 12/2011 | Wong et al. |
| 2011/0316703 A1 | 12/2011 | Butler et al. |
| 2011/0320054 A1 | 12/2011 | Brzezowski |
| 2012/0022700 A1 | 1/2012 | Drees et al. |
| 2012/0039503 A1 | 2/2012 | Chen et al. |
| 2012/0062382 A1 | 3/2012 | Taneff |

(56) References Cited

U.S. PATENT DOCUMENTS

| | | |
|---|---|---|
| 2012/0075464 A1 | 3/2012 | Derenne et al. |
| 2012/0109988 A1 | 5/2012 | Li et al. |
| 2012/0112883 A1 | 5/2012 | Wallace et al. |
| 2012/0131217 A1 | 5/2012 | Delorme et al. |
| 2012/0158185 A1 | 6/2012 | El-Mankabady et al. |
| 2012/0216243 A1 | 8/2012 | Gill et al. |
| 2012/0224057 A1 | 9/2012 | Gill et al. |
| 2012/0259466 A1 | 10/2012 | Ray et al. |
| 2012/0262472 A1 | 10/2012 | Garr et al. |
| 2012/0272146 A1 | 10/2012 | D'souza et al. |
| 2012/0291068 A1 | 11/2012 | Khushoo et al. |
| 2012/0303652 A1 | 11/2012 | Tseng |
| 2012/0310418 A1 | 12/2012 | Harrod et al. |
| 2012/0323376 A1 | 12/2012 | Honda et al. |
| 2013/0055132 A1 | 2/2013 | Foslien |
| 2013/0060794 A1 | 3/2013 | Puttabasappa et al. |
| 2013/0082842 A1 | 4/2013 | Balazs et al. |
| 2013/0086152 A1 | 4/2013 | Hersche et al. |
| 2013/0091631 A1 | 4/2013 | Hayes et al. |
| 2013/0110295 A1 | 5/2013 | Zheng et al. |
| 2013/0158728 A1 | 6/2013 | Lee et al. |
| 2013/0169681 A1 | 7/2013 | Rasane et al. |
| 2013/0184880 A1 | 7/2013 | McMahon |
| 2013/0187775 A1 | 7/2013 | Marsden et al. |
| 2013/0204570 A1 | 8/2013 | Mendelson et al. |
| 2013/0229276 A1 | 9/2013 | Hunter |
| 2013/0268293 A1 | 10/2013 | Knudson et al. |
| 2013/0289774 A1 | 10/2013 | Day et al. |
| 2014/0032157 A1 | 1/2014 | Khiani |
| 2014/0040998 A1 | 2/2014 | Hsieh |
| 2014/0046490 A1 | 2/2014 | Foslien et al. |
| 2014/0046722 A1 | 2/2014 | Rosenbloom et al. |
| 2014/0058539 A1 | 2/2014 | Park |
| 2014/0167917 A2 | 6/2014 | Wallace et al. |
| 2014/0207291 A1 | 7/2014 | Golden et al. |
| 2014/0292518 A1 | 10/2014 | Wildman et al. |
| 2014/0307076 A1 | 10/2014 | Deutsch |
| 2014/0309757 A1 | 10/2014 | Le Sant et al. |
| 2014/0316582 A1 | 10/2014 | Berg-Sonne et al. |
| 2014/0320289 A1 | 10/2014 | Raichman |
| 2014/0342724 A1 | 11/2014 | Hill et al. |
| 2015/0025329 A1 | 1/2015 | Amarasingham et al. |
| 2015/0032264 A1 | 1/2015 | Emmons et al. |
| 2015/0056909 A1 | 2/2015 | Chien |
| 2015/0070174 A1 | 3/2015 | Douglas |
| 2015/0077258 A1 | 3/2015 | Nelson et al. |
| 2015/0113462 A1 | 4/2015 | Chen et al. |
| 2015/0153918 A1 | 6/2015 | Chen et al. |
| 2015/0161874 A1 | 6/2015 | Thyroff et al. |
| 2015/0167995 A1 | 6/2015 | Fadell et al. |
| 2015/0168949 A1 | 6/2015 | Hua et al. |
| 2015/0194043 A1 | 7/2015 | Dunn et al. |
| 2015/0198707 A1 | 7/2015 | Al-Alusi |
| 2015/0212717 A1 | 7/2015 | Nair et al. |
| 2015/0213222 A1 | 7/2015 | Amarasingham et al. |
| 2015/0213379 A1 | 7/2015 | Nair et al. |
| 2015/0216369 A1 | 8/2015 | Hamilton et al. |
| 2015/0253748 A1 | 9/2015 | Brun et al. |
| 2015/0281287 A1 | 10/2015 | Gill et al. |
| 2016/0012340 A1 | 1/2016 | Georgescu et al. |
| 2016/0061476 A1 | 3/2016 | Schultz et al. |
| 2016/0061477 A1 | 3/2016 | Schultz et al. |
| 2016/0061794 A1 | 3/2016 | Schultz et al. |
| 2016/0061795 A1 | 3/2016 | Schultz et al. |
| 2016/0063833 A1 | 3/2016 | Schultz et al. |
| 2016/0066067 A1 | 3/2016 | Schultz et al. |
| 2016/0094445 A1 | 3/2016 | Sella et al. |
| 2016/0116181 A1 | 4/2016 | Aultman et al. |
| 2016/0139067 A1 | 5/2016 | Grace |
| 2016/0139576 A1 | 5/2016 | Aiken et al. |
| 2016/0253897 A1 | 9/2016 | Wildman et al. |
| 2016/0255516 A1 | 9/2016 | Hill et al. |
| 2016/0298864 A1 | 10/2016 | Ekolind et al. |
| 2016/0306934 A1 | 10/2016 | Sperry et al. |
| 2016/0314683 A1 | 10/2016 | Felch et al. |
| 2016/0328948 A1 | 11/2016 | Ferniany |
| 2016/0335731 A1 | 11/2016 | Hall |
| 2016/0367925 A1 | 12/2016 | Blackley |
| 2017/0024986 A1 | 1/2017 | Austin |
| 2017/0074539 A1 | 3/2017 | Bentz et al. |
| 2017/0105129 A1 | 4/2017 | Teplin et al. |
| 2017/0153799 A1* | 6/2017 | Hoyer ............... G06Q 10/0631 |
| 2017/0193792 A1 | 7/2017 | Bermudez Rodriguez et al. |
| 2017/0256155 A1 | 9/2017 | Sengstaken, Jr. |
| 2017/0280949 A1 | 10/2017 | Wildman et al. |
| 2017/0294106 A1 | 10/2017 | Thyroff |
| 2017/0365024 A1 | 12/2017 | Koch et al. |
| 2018/0016773 A1 | 1/2018 | Chandler et al. |
| 2018/0151054 A1 | 5/2018 | Pi |
| 2018/0218591 A1 | 8/2018 | Easter |
| 2018/0293038 A1 | 10/2018 | Meruva et al. |
| 2018/0299845 A1 | 10/2018 | Ajax et al. |
| 2018/0301014 A1 | 10/2018 | Worral et al. |
| 2018/0313695 A1 | 11/2018 | Shim et al. |
| 2018/0365957 A1 | 12/2018 | Wright et al. |
| 2019/0051138 A1 | 2/2019 | Easter |
| 2019/0139395 A1 | 5/2019 | Rogachev et al. |
| 2019/0171171 A1 | 6/2019 | Verteletskyi et al. |
| 2019/0209719 A1 | 7/2019 | Andersen et al. |
| 2020/0009280 A1 | 1/2020 | Kupa et al. |
| 2020/0074836 A1 | 3/2020 | Kolavennu et al. |
| 2020/0090089 A1 | 3/2020 | Aston et al. |
| 2020/0146557 A1 | 5/2020 | Cheung et al. |
| 2020/0191425 A1 | 6/2020 | Endel et al. |
| 2020/0191428 A1 | 6/2020 | Endel et al. |
| 2020/0200420 A1 | 6/2020 | Nayak et al. |

FOREIGN PATENT DOCUMENTS

| | | |
|---|---|---|
| CN | 103110410 A | 5/2013 |
| CN | 103970977 A | 8/2014 |
| CN | 105116848 A | 12/2015 |
| CN | 108961714 A | 12/2018 |
| CN | 110009245 A | 7/2019 |
| CN | 110084928 A | 8/2019 |
| CN | 110827457 A | 2/2020 |
| EP | 1669912 A1 | 6/2006 |
| EP | 2310981 A1 | 4/2011 |
| JP | 7085166 A | 3/1995 |
| JP | 11024735 A | 1/1999 |
| JP | 11317936 A | 11/1999 |
| JP | 2001356813 A | 12/2001 |
| JP | 2005242531 A | 9/2005 |
| JP | 2005311563 A | 11/2005 |
| KR | 1172747 B1 | 8/2012 |
| KR | 101445367 B1 | 10/2014 |
| KR | 1499081 B1 | 3/2015 |
| WO | 9621264 A3 | 11/1996 |
| WO | 2004029518 A1 | 4/2004 |
| WO | 2005045715 A2 | 5/2005 |
| WO | 2008152433 A1 | 12/2008 |
| WO | 2008157755 A1 | 12/2008 |
| WO | 2009012319 A2 | 1/2009 |
| WO | 2009079648 A1 | 6/2009 |
| WO | 2010106474 A1 | 9/2010 |
| WO | 2011025085 A1 | 3/2011 |
| WO | 2011043732 A1 | 4/2011 |
| WO | 2011057173 A2 | 5/2011 |
| WO | 2011123743 A1 | 10/2011 |
| WO | 2013062725 A1 | 5/2013 |
| WO | 2013178819 A1 | 12/2013 |
| WO | 2014009291 A1 | 1/2014 |
| WO | 2014098861 A1 | 6/2014 |
| WO | 2014135517 A1 | 9/2014 |
| WO | 2016094445 A1 | 6/2016 |
| WO | 2016123536 A1 | 8/2016 |
| WO | 2017057274 A1 | 4/2017 |

(56) References Cited

FOREIGN PATENT DOCUMENTS

| | | |
|---|---|---|
| WO | 2019046580 A1 | 3/2019 |
| WO | 2020024553 A1 | 2/2020 |

OTHER PUBLICATIONS

"Fuzzy Logic Toolbox 2.1, Design and Stimulate Fuzzy Logic Systems," The MathWorks, 2 pages, May 2004.
"Junk Charts, Recycling Chartjunk as junk art," 3 pages, Oct. 2, 2006.
"Model Predictive Control Toolbox 2, Develop Internal Model-Based Controllers for Constrained Multivariable Processes," The MathWorks, 4 pages, Mar. 2005.
Honeywell, "Product Guide 2004," XP-002472407, 127 pages, 2004.
"Statistics Toolbox, for Use with Matlab," User's Guide Version2, The MathWorks, 408 pages, Jan. 1999.
"Vykon Energy Suite Student Guide," Tridium Inc., 307 pages, Mar. 3, 2006.
"Web Based Energy Information Systems for Energy Management and Demand Response in Commercial Buildings," California Energy Commission, 80 pages, Oct. 2003.
Andover Controls, Network News, vol. 2, No. 2, 8 pages, 1997.
Andover Controls World, 4 pages, Spring 1997.
Bell, Michael B. et al., "Early Event Detection-Results from A Prototype Implementation," AICHE Spring National Meeting, 15 pages, Apr. 2005.
Cadgraphics, "The CADGRAPHICS User's Guide," 198 pages, 2003.
Carrier Comfort Network CCN Web, "Web Browser User Interface to the Carrier Comfort Network," 2 pages, 2002.
Carrier Comfort Network CCN Web, Overview and Configuration Manual, 134 pages, Apr. 2006.
Carrier Comfort Network CCN Web, Product Data, 2 pages, Apr. 2006.
Carrier, "i-Vu Powerful and Intuitive Front End for Building Control," 2 pages, Aug. 2005.
Carrier, "i-Vu Web-Based Integrated Control System," 3 pages, 2005.
Carrier, Demo Screen Shots, 15 pages, prior to Aug. 27, 2007.
Carrier, i-Vu CCN 4.0, Owner's Guide, 20 pages, Jul. 2007.
Carrier, i-Vu CCN, 7 pages, 2007.
Chen, Tony. F., "Rank Revealing QR Factorizations," Linear Algebra and It's Applications, vol. 88-89, p. 67-82, Apr. 1987.
Circon, "i-Browse Web-Based Monitoring and Control for Facility Management," 2 pages, prior to Aug. 27, 2007.
Published Australian Application 2009904740, 28 pages, Application Filed on Sep. 29, 2009.
Echelon, "Energy Control Solutions with the i.Lon SmartServer," 4 pages, 2007.
Echelon, "i.Lon 100e3 Internet Server Models 72101R-300, 72101R-308, 72102R-300, 72103-R300 . . . " 5 pages, copyright 2002-2007.
Echelon, "i.Lon 100e3 Internet Server New Features," 15 pages, Sep. 2006.
Echelon, "i.Lon SmartServer," 5 pages, 2007.
Honeywell News Release, "Honeywell's New Sysnet Facilities Integration System for Boiler Plant and Combustion Safety Processes," 4 pages, Dec. 15, 1995.
Honeywell, "Excel Building Supervisor-Integrated R7044 and FS90 Ver. 2.0," Operator Manual, 70 pages, Apr. 1995.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, Excel 15B W7760B Building Manager Release 2.02.00, Installation Instructions, 28 pages, Dec. 2004.
Honeywell, The RapidZone Solution, Excel 5000 Open System, Application Guide, 52 pages, Jan. 2004.
http://pueblo.lbl.gov/~olken . . . , "Remote Building Monitoring and Operations Home Page," 5 pages, prior to Aug. 27, 2007.
http://www.commercial.carrier.com/commercial/hvac/productdescription . . . , "Carrier: i-Vu CCN," 1 page, printed Mar. 11, 2008.
http://www.commercial.carrier.com/commercial/hvac/productdescription . . . , "Carrier: 33CSCCNWEB-01 CCN Web Internet Connection to the Carrier Comfort Network," 1 page, printed Mar. 11, 2008.
http://www.docs.hvacpartners.com/idc/groups/public/documents/techlit/gs-controls-ivuccn.rtf, "Products," 5 pages, printed Jul. 3, 2007.
http://www.lightstat.com/products/istat.asp, Lightstat Incorporated, "Internet Programmable Communicating Thermostats," 1 page, printed Mar. 13, 2007.
http://www.sharpsystems.com/products/pc_notebooks/actius/rd/3d/, "Actius RD3D Desktop Replacement Notebook with Industry-Breakthrough 3D Screen," Sharp, 1 page, printed Jun. 16, 2005.
http://www2.sims.berkeley.edu/courses/is213/s06/projects/lightson;final.html, "Lights on o Wireless Lighting Control System," 11 pages, printed Mar. 22, 2007.
I.Lon 100e3 Internet Server, 1 page, prior to Aug. 27, 2007.
I.Lon, SmartServer, 2 pages, prior to Aug. 27, 2007.
I-stat, Demo Screen Shots, 9 pages, printed Mar. 13, 2007.
I-stat, The Internet Programmable Thermostat, 2 pages, prior to Aug. 27, 2007.
Jeffrey Ball, "Green Goal of 'Carbon Neutrality' Hits Limit," TheWall Street Journal, 7 pages, Dec. 30, 2008.
Johnson Controls, Network Integration Engine (NIE) 3 pages, Nov. 9, 2007.
Johnson Controls, Network Integration Engine (NIE), Product Bulletin, pp. 1-11, Jan. 30, 2008.
Kourti, Theodora, "Process Analysis and Abnormal Situation Detection: From Theory to Practice," IEEE Control Systems Magazine, p. 10-25, Oct. 2002.
Mathew, Paul A., "Action-Oriented Benchmarking, Using CEUS Date to Identify and Prioritize Efficiency Opportunities in California Commercial Buildings," 26 pages, Jun. 2007.
Morrison, Don et al., "The Early Event Detection Toolkit," Honeywell Process Solutions, 14 pages, Jan. 2006.
Narang, "WEBARC: Control and Monitoring of Building Systems Over the Web," 53 pages, May 1999.
Olken et al., "Object Lessons Learned from a Distributed System for Remote Building Monitoring and Operation," ACM SIGPLAN Notices, vol. 33, No. 10, pp. 284-295, Oct. 1998.
Proliphix, Inc., "Proliphix IP Devices: HTTP API," 28 pages, Jan. 23, 2006.
Proliphix, Inc., Remote Management User Guide, 12 pages, prior to Aug. 27, 2007.
Richard Rogan et al., "Smart and Final Food Stores: A Case Study in Web Based Energy Information and Collection," Web Based Energy Information and Control Systems: Case Studies and Application, Chapter 6, p. 59-64, 2005.
Sharp, "Actius AL3DU 3D LC Display High Performance 3D Visualization," 2 pages, prior to Mar. 17, 2006.
So et al., "Building Automation on the Information Superhighway," ASHRAE (American Society of Heating Refrigerating, and Air Conditioning) Transactions, vol. 104, Part 2, pp. 176-191, 1998.
So et al., "Building Automation Systems on the Internet," Facilities vol. 15, No. 5/6, pp. 125-133, May/Jun. 1997.
Talon, "Raptor Controller," 6 pages, Oct. 2003.
Talon, "Workstation Software," 4 pages, Nov. 2002.
Trane, "System Programming, Tracer Summit Version 14, BMTW-SVP01D-EN," 623 pages, 2002.
Lucid Design Group, Inc., "Building Dashboard," 2 pages, Printed May 30, 2013.
"America's Largest Managed Security Services Provider Launches Comprehensive, Integrated Covid-19 Safety Program for Office Buildings and Suites," KastleSafeSpaces, 5 pages, May 11, 2020.
"Biometric Door Reader With Body Temperature Detection," Kintronics, 9 pages, accessed May 21, 2020.
"Body Surface Temperature Screening with Alarm Function TVS-200IS/TVS-500IS," Nippon Avionics Co., 3 pages, accessed May 21, 2020.

(56) References Cited

OTHER PUBLICATIONS

"BriefCam announces video analytics innovation for contact tracing, physical distancing, occupancy management and face mask detection," BriefCam LTD, 11 pages, Jun. 5, 2020.
"Thermal Imaging SmartPhone Can Be used For Temperature Screening of People," CAT, 3 pages, accessed Jul. 13, 2020.
"Contact Tracing Now Available on Identiv's Hirsch Velocity Access Control Platform," IDENTIV, 5 pages, May 21, 2020.
Silva et al., "Cough localization for the detection of respiratory diseases in pig houses," ScienceDirect, 7 pages, May 28, 2008.
Oey et al., "Evaluation of Isolation Compliance Using Real Time Video in Critical Care," North Shore University Hospital, 1 page, Oct. 9, 2015.
"Facial Attendace System With Temperature Screening Now in India," IANS, 5 pages, Mar. 19, 2020.
"Plan to Re-Open," EHIGH, 16 pages, accessed Jun. 13, 2020.
"How Smarter AI-Powered Cameras Can Mitigate the Spread of Wuhan Novel," AnyConnect, 22 pages, 2020.
"How to fight COVID-19 with machine learning," DataRevenue, 20 pages, accessed May 25, 2020.
"INNCONTROL 5," Honeywell, 2 pages, Aug. 8, 2018.
"IP Door Access Control," KINTRONICS, 21 pages, 2014.
"Kogniz AI Health Response Platform," KOGNIZ, 9 pages, accessed May 21, 2020.
"Machine Learning Could Check if You're Social Distancing Properly at Work," MIT Technology Review, 7 pages, Apr. 17, 2020.
Punn et al., "Monitoring COVID-19 social distancing with person detection and tracking via fine-tuned YOLO v3 and Deepsort techniques," 10 pages, May 6, 2020.
"NEC launches dual face biometric and fever detection system for access control," Biometric Update, 4 pages, May 8, 2020.
"Remote temperature monitoring," AXIS Communication, 10 pages, 2014.
"FebriEye-AI Based Thermal Temperature Screening System," vehant, 1 pages, 2020.
Juliana Bocicor et al. "Wireless Sensor Network based System for the Prevention of Hospital Acquired Infections", arxiv.org, Cornell University Ithaca, NY 14853, May 2, 2017, XP080947042, (Abstract).
Shhedi Zaid Ali et al., "Traditional and ICT Solutions for Preventing the Hospital Acquired Infection", 2015 20th International Conference on Control Systems and Computer Science, IEEE, May 27, 2015, pp. 867-873, XP033188038.
Extended European Search Report, EP application No. 20151295.1, pp. 13, May 26, 2020.
EP Application No. 19216744, Extended European Search Report, pp. 7, dated Apr. 28, 2020.
www.geappliances.com/home-energy-manager/about-energy-monitors. htm, "Energy Monitor, Home Energy Monitors, GE Nucleus," 2 pages, printed Jan. 15, 2013.
www.luciddesigngroup.com/network/apps.php#homepage, "Lucid Design Group—Building Dashboard Network—Apps," 7 pages, Jan. 15, 2013.
Preuveneers et al., "Intelligent Widgets for Intuitive Interaction and Coordination in Smart Home Environments," IEEE Eighth International Conference on Intelligent Environments, pp. 157-164, 2012.
Wu et al., "A Web 2.0 Based Scientific Application Framework," 7 pages, prior to Jul. 24, 2014.
"4.0 Today's Activities, The Home Dashboard," CRBM info@hand website, 46 pages, prior to Apr. 25, 2013.
"Free Facilities Dashboards," eSight Energy Website, 2 pages, prior to Apr. 25, 2013.
Alerton Building Controls, Gallery Prints, 7 pages, Dec. 19, 2013.
Carter, "Industrial Energy Management Dashboards Require a Toolkit," Cross Automation, 11 pages, Nov. 4, 2013.
See The World in a New Way Hikvision Thermal Cameras, HIKVISION, 12 pages, 2017.
Allain, "Trying out the iPhone Infrared Camera: The FLIR One," WIRED, 15 pages, 2014.
Dasgupta, "Your voice may be able to tell you if you have Covid," Hindustan Times, 4 pages, Apr. 16, 2020.
Ganguty, "Gurugram-based startup Staqu has modified AI-powered JARVIS to battle coronavirus," YOURSTORY, 7 pages, Mar. 31, 2020.
e-homecontrols.com, "e-Home Controls Website," link to actual website No. longer works, 1 page, prior to Dec. 19, 2013.
http://www.ccbac.com, "C&C (/)—Omniboard," 5 pages, Dec. 19, 2013.
http://www.domcontroller.com/en/, "DomController Home Automation Software—Control Anything from Anywhere," 11 pages, printed Jan. 6, 2015.
http://www.novar.com/ems-bas/opus-building-automation-system, "Novar OPUS BAS," 1 page, prior to Feb. 13, 2013.
Instituto Superior Tecnico, "A 3D Interactive Environment for Automated Building Control," Master's Dissertation, 120 pages, Nov. 2012.
Panduit Corp., "Enable a Building Automation with Panduit Enterprise Solutions," 4 pages, Nov. 2012.
"WEBs-AX Web-Enabled Building Solutions," sales brochure, Honeywell International Inc., Mar. 2009.
"Attune Advisory Services," press release, Honeywell International Inc., Mar. 20, 2012.
EnteliWEB product from Delta Controls, web pages retrieved on May 9, 2013 from http://deltacontrols.com/products/facilities-management/supervisory-software et seq. by the Internet Archive at web.archive.org.
"BACnet Protocol Implementation Conformance Statement" for enteliWEB, Delta Controls, Jul. 17, 2013.
Castle, "7 Software Platforms that Make Building Energy Management Easy," http://greentechadvocates.com/2012/11/28/7-software-platforms-that-make-building-energy-managment-easy/, Nov. 28, 2012.
EnteliWEB catalog sheet, Delta Controls, Inc., 2012.
EnteliWEB catalog sheet, Delta Controls., 2010.
"Intelligent Building Management Systems in Miami," Advanced Control Corp., Mar. 7, 2013.
"The Ohio State University," BACnet International Journal, vol. 5, p. 4, Jan. 2013.
Bobker et al., "Operational Effectiveness in Use of BAS," Proceedings of the 13th International Conference for Enhanced Building Operations, Oct. 8, 2013.
Castelo, "A 3D Interactive Environment for Automated Building Control," Elsevier, Nov. 8, 2012.
"Creston Special Report: How Intelligent building management solutions are reducing operational costs," Creston, 2012.
"Building Automation Software Solutions," Iconics, 2013.
Lacey, "The Top 10 Software Vendors Connecting Smart Buildings to the Smart Grid," http://www.greentechmedia.com/articles/read/the-top-10-companies-in-enterprise-smart-grid, Jul. 18, 2013.
"Data analytics and smart buildings increase comfort and energy efficiency", https://www.microsoft.com/itshowcase/Article/Content/845/Data-analytics-and-smart-buildings-increase-comfort-and-energy-efficiency, Dec. 19, 2016, 8 pages.
Donnelly, "Building Energy Management: Using Data as a Tool", http://www.buildingefficiencyinitiative.org/sites/default/files/legacy/InstituteBE/media/Library/Resources/Existing-Building-Retrofits/Using-Building-Data-as-a-Tool.pdf, Oct. 2012, 9 pages.
"ASHRAE Dashboard Research Project," 29 pages, Aug. 28, 2008.
"NiagraAX Product Model Overview," Tridium, Inc., 2005.
"An Overview of NiagraAX: A comprehensive software platform designed to create smart device applications," Tridium, Inc., 2005.
"Phoenix Controls Portal," Phoenix Controls, Inc., 2013.
Quirk, "A Brief History of BIM," Arch Daily, Dec. 7, 2012.
Samad et al., "Leveraging the Web: A Universal Framework for Building Automation," Proceedings of the 2007 American Control Conference, Jul. 11, 2007.
Sinha et al., "9 Key attributes of energy dashboards and analytics tools," https://www.greenbiz.com/blog/2013/08/28/9-key-attributes-energy-dashboards-and=analytics-tools, Aug. 28, 2013.
Sinopoli, "Dashboards For Buildings," http://www/automatedbuildings.com/news/dec10/articles/sinopoli/101119034404sinopoli.html, Dec. 2010.

(56) References Cited

OTHER PUBLICATIONS

Sinopoli, "Modeling Building Automation and Control Systems," http://www.automatedbuildings.com/news/jun13/articles/sinopoli/130521122303sinopoli.html, Jun. 2013.
Zito, "What is Tridium Part 1," http://blog.buildingautomationmonthly.com/what-is-tridium/, May 12, 2013.
Zito, "What is Tridium Part 2," http://blog.buildingautomationmonthly.com/tridium-part-2/, Sep. 10, 2013.
Search Report and Written Opinion from related International PCT Application No. PCT/US2018/025189 dated Jul. 17, 2018 (12 pages).

* cited by examiner

SPACE UTILIZATION PATTERNS FOR BUILDING OPTIMIZATION

This is a continuation of co-pending U.S. patent application Ser. No. 16/900,394, filed Jun. 12, 2020, and entitled "SPACE UTILIZATION PATTERNS FOR BUILDING OPTIMIZATION", which is incorporated herein by reference.

TECHNICAL FIELD

The present disclosure relates generally to buildings. More particularly, the present disclosure relates to identifying space utilization within buildings.

BACKGROUND

Buildings are used for a variety of different purposes, such as but not limited to office space, manufacturing and the like. Buildings typically include a number of different spaces such as rooms, offices, hallways, conference rooms, lunch rooms, and restrooms, among others. It will be appreciated that the relative usage, or occupancy, of the different spaces of the building may vary over time, and may vary depending on the specific building spaces. Some building spaces may be heavily used while other building spaces may be more sparsely used. It will be appreciated that in some cases, spaces that are heavily used may require more maintenance such as cleaning while spaces that are not heavily used may not require as much maintenance. Many buildings have equipment installed within them. As an example, assume a building has a large copier/printer. If a majority of the people utilizing that copier/printer have offices or work spaces that are on an opposite side of the building from the copier/printer, it may make sense to move the copier/printer closer to those people. This is just an example. What would be desirable is an improved way to identify and then manage space utilization within buildings.

SUMMARY

The present disclosure relates generally to managing buildings by tracking their relative usage and occupancy. In one example, a method of operating a building that has a plurality of spaces includes receiving space information from a building information model of the building, the space information defining a plurality of spaces within a building. Occupancy data over time is received for each of two or more of the plurality of spaces within a building from occupancy sensors that are disposed within each of the two or more of the plurality of spaces within the building. An occupancy value is determined for each of at least some of the two or more of the plurality of spaces within the building based on the received occupancy data, each occupancy value representative of a percent of time that the respective space was occupied over an identified period of time. The one of the plurality of spaces that had a highest occupancy value over the identified period of time is identified. A utilization value is determined for each of at least some of the two or more of the plurality of spaces within the building, wherein the utilization value is representative of a ratio of the occupancy value of the respective space relative to the highest occupancy value. An operation of the building is changed based at least in part on the utilization value of at least one of the plurality of spaces.

In another example, a method of improving space utilization within a building having a plurality of spaces includes receiving sensor signals from a plurality of occupancy sensors distributed throughout the plurality of spaces over time. The sensor signals are processed to determine an occupancy value for at least some of the plurality of spaces within the building. A utilization value is calculated for at least some of the plurality of spaces within the building based at least in part upon the occupancy values over an identified period of time. An operation of the building is changed to improve utilization of spaces having a utilization value that is below (or above) a utilization value threshold.

In another example, a method of improving maintenance within a building having a plurality of spaces includes receiving sensor signals from a plurality of occupancy sensors distributed throughout the plurality of spaces, where sensor signals are received from each of the plurality of occupancy sensors over time. The sensor signals are processed to determine an occupancy value for at least some of the plurality of spaces within the building. A utilization value is calculated for at least some of the plurality of spaces within the building based at least in part upon the occupancy values over an identified period of time. The scheduled maintenance frequency is increased for spaces having a utilization value that is at or above a high utilization value threshold and is decreased for spaces having a utilization value that is below a low utilization value threshold.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
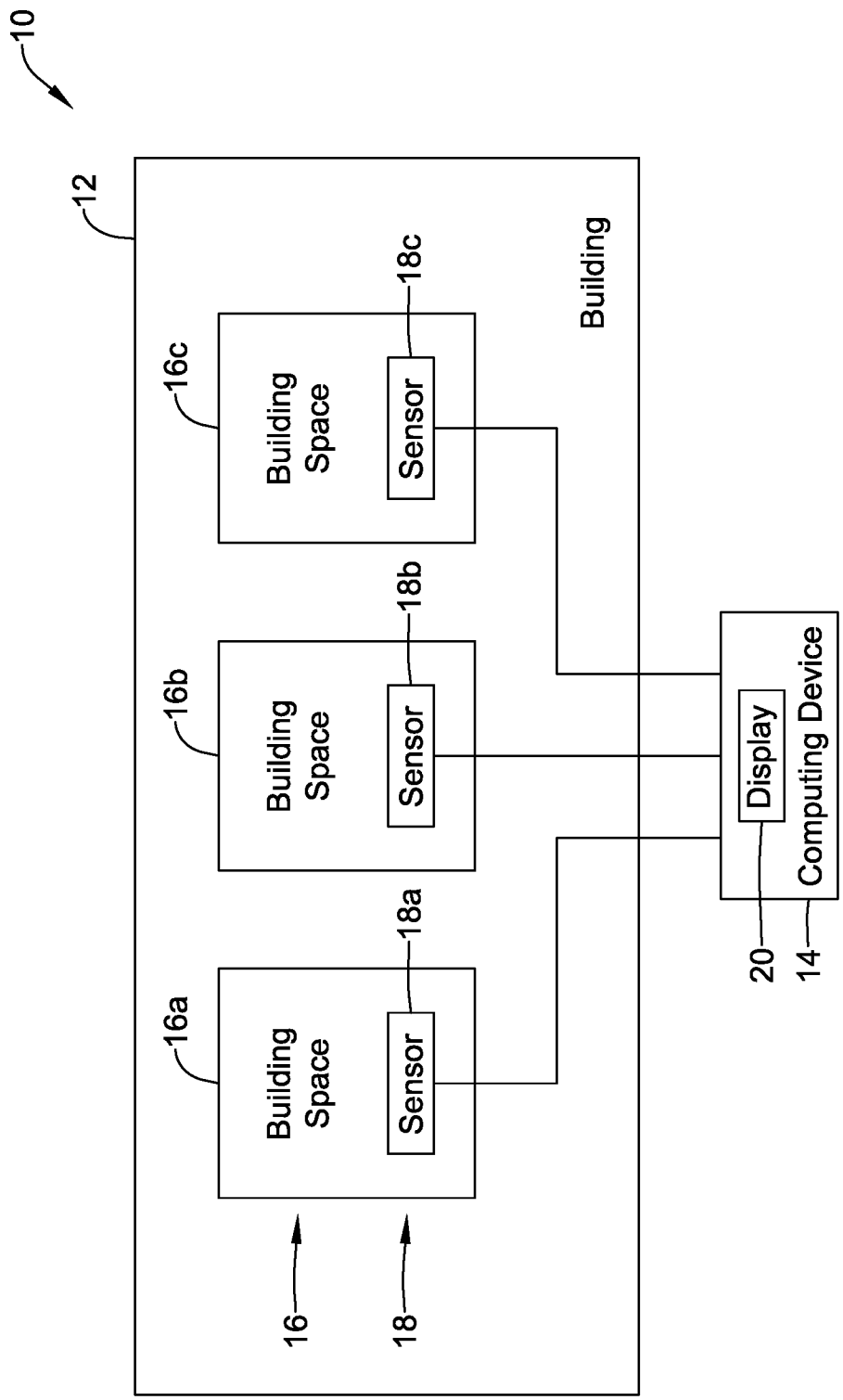
FIG. 1 is a schematic block diagram of an illustrative building system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative building system 10. In its broadest terms, the illustrative building system 10 includes a building 12 and a computing device 14. The building 12 includes a number of building spaces 16, individually labeled as 16a, 16b, 16c. While a total of three building spaces 16 are illustrated, it will be appreciated that this is merely illustrative, as the building 12 may have any number of distinct building spaces. In many cases, the building 12 may have a large number of building spaces, sometimes distributed over multiple floors or levels of the building 12. Each of the building spaces 16 may represent offices, hallways, conference rooms, lunch rooms, break rooms, manufacturing areas and the like.

In some instances, as shown, each of the building spaces 16 includes a sensor 18 individually labeled as 18a, 18b, 18c. While each of the building spaces 16 is shown as having one sensor 18, in some cases at least some of the building spaces 16 may include two or more sensors 18. The sensors 18 may take any of a variety of different forms. In some cases, at least some of the sensors 18 are occupancy sensors that are configured to determine whether a particular space is currently occupied or not. At least some of the sensors 18 may be motion sensors. If motion is detected, the space is presumed to be occupied. If no motion is detected for a period of time, the space is presumed to not be occupied. Some of the sensors 18 may be microphones, listening for noises that may indicate occupancy. Some noises, such as air moving through an HVAC duct, or a PA system, may be detected but do not indicate occupancy. Other noises, such as a person heard talking within a space, or noises made while the person walks, may be detected and do indicate occupancy. In some cases, occupancy detection can be carried out as described in co-pending U.S. patent application Ser. No. 16/224,670 and U.S. patent application Ser. No. 16/224,675, both filed Dec. 18, 2018 and both incorporated hereby by reference.

In some cases, at least some of the sensors 18 may be considered as being part of what is known as a digital ceiling. In some instances, at least some of the sensors 18 may represent smart flooring. Smart flooring is a flooring material such as an entrance mat that includes sensors that can detect a person walking on the entrance mat. Such an entrance mat placed at the entrance of each building space can provide an indication of occupancy. If a person is detected entering a building space, but is not detected leaving that building space, an assumption may be appropriately made that the person is still in that building space, and thus that building space is considered to be occupied.

The sensors 18 are operably coupled with the computing device 14. While shown as being outside of the building 12, this is not required in all cases. Rather, the computing device 14 may be disposed within the building 12. In some cases, the computing device 14 may be remote from the building 12, and may even represent a cloud-based server. The computing device 14 may include a display 20 that may be configured to display information received from at least some of the sensors 18. The computing device 14 may receive information from at least some of the sensors 18 pertaining to occupancy and may generate a heat map that shows relative usage of various building spaces 16 over time.

In some instances, the computing device 14 may utilize the received occupancy data to determine which of the building spaces 16 has been used the most, and may calculate a relative usage for each of the other building spaces 16. In some cases, the computing device 14 may generate and display on the display 20 a heat map that provides a graphical representation of the relative occupancy data. In some instances, the computing device 14 may also display on the heat map an indication of which building spaces 16 are currently occupied. In some cases, the computing device 14 may make recommendations regarding relative maintenance schedules, or even space allocation suggestions, based on the relative occupancy over time.

Figure 2:
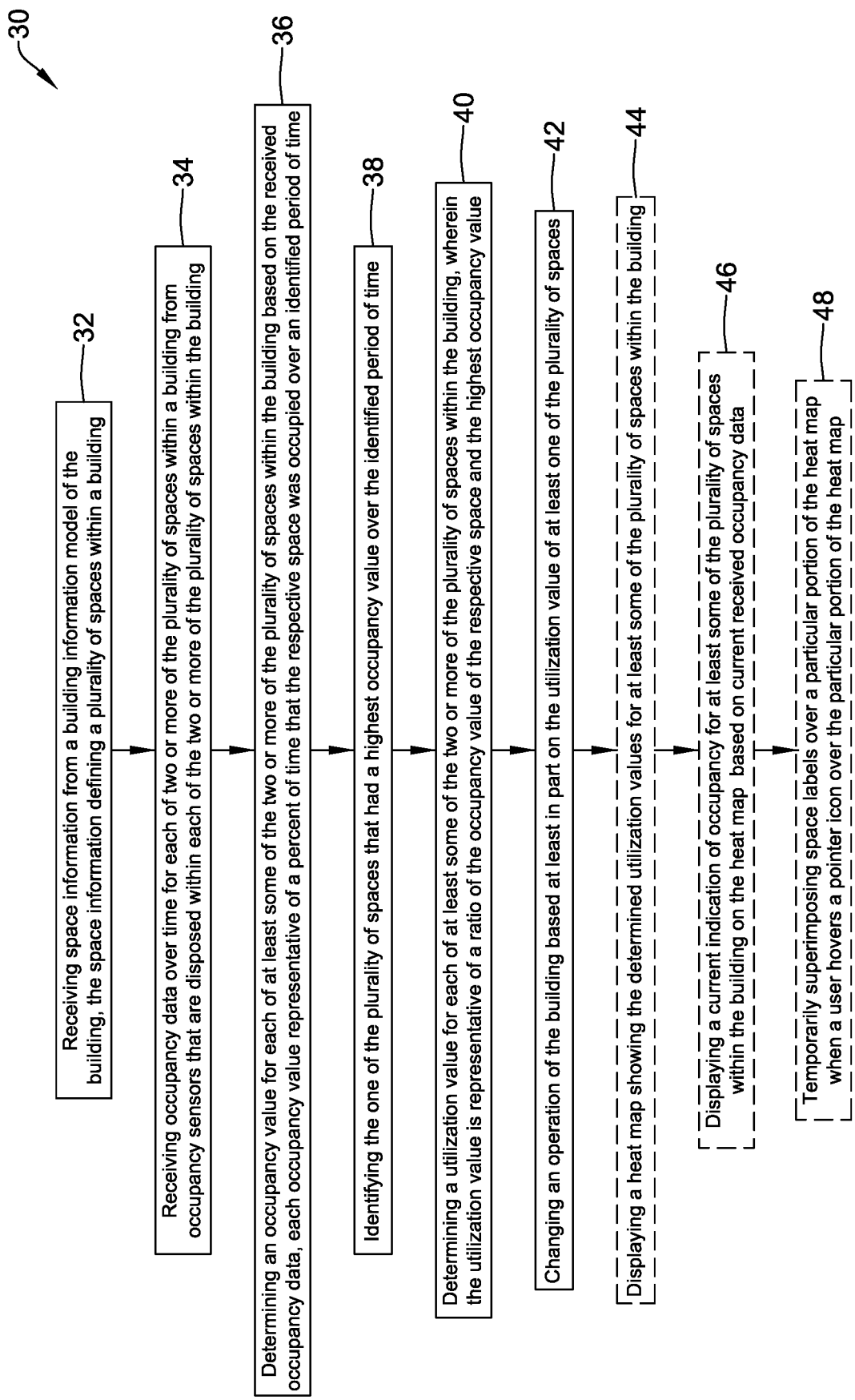
FIG. 2 is a flow diagram showing an illustrative method of operating a building.

FIG. 2 is a flow diagram showing an illustrative method 30 of operating a building (such as the building 12) that has a plurality of spaces (such as the building spaces 16). In some cases, at least some of the plurality of spaces include offices, hallways and conference rooms. Space information is received from a building information model (BIM) of the building, the space information defining a plurality of spaces within a building, as indicated at block 32. Occupancy data over time is received for each of two or more of the plurality of spaces within a building from occupancy sensors (such as the sensors 18) that are disposed within each of the two or more of the plurality of spaces within the building, as indicated at block 34. In some cases, the period of time may be selected by a user. The user may, for example, be allowed to select one or more of a start time, an end time and a duration of the identified period of time.

An occupancy value is determined for each of at least some of the two or more of the plurality of spaces within the building based on the received occupancy data, each occupancy value representative of a percent of time that the respective space was occupied over the identified period of time, as indicated at block 36. In some cases, when a space of the plurality of spaces has two or more occupancy sensors providing the occupancy data for that space, the occupancy data for that space is scaled according to the number of occupancy sensors in that space providing the occupancy data. For example, if a space has three occupancy sensors, the occupancy data from the three sensors may be divided by three for that space so as to be properly comparable to spaces that only have one occupancy sensor.

The one of the plurality of spaces that had a highest occupancy value over the identified period of time is identified, as indicated at block 38. An utilization value for each of at least some of the two or more of the plurality of spaces within the building is determined, wherein the utilization value is representative of a ratio of the occupancy value of the respective space with respect to the highest occupancy value, as indicated at block 40. In some cases, an operation of the building is changed based at least in part on the utilization value of at least one of the plurality of spaces, as indicated at block 42.

Changing the operation of the building may include, for example, changing an operation of an HVAC system, an access control system and/or a surveillance system that services the building. Changing the operation of the building may include increasing a maintenance schedule for spaces of the building for which the respective utilization value, for example exceeds a threshold. Maintenance may include janitorial cleaning services and/or equipment maintenance for equipment. In some cases, changing the operation of the building may include redirecting occupants of the building toward spaces of the building that have lower utilization values. Changing the operation of the building may include making physical changes in a structure of the building or contents of the building based at least in part on the utilization value of at least one of the plurality of spaces. This may include adding/removing/moving walls and/or adding/removing/moving equipment within the building.

In some cases, the method 30 may further include displaying a heat map showing the determined utilization values for at least some of the plurality of spaces within the building, as optionally indicated at block 44. A current indication of occupancy may be displayed for at least some of the plurality of spaces within the building on the heat map based on current received occupancy data, as optionally indicated at block 46. In some cases, space labels may be temporarily superimposed over a particular portion of the heat map when a user hovers a pointer icon over the particular portion of the heat map, as optionally indicated at block 48. The space labels may provide additional information about the particular space, such as a space name, utilization value, access to raw occupancy data and/or any other suitable information.

Figure 3:
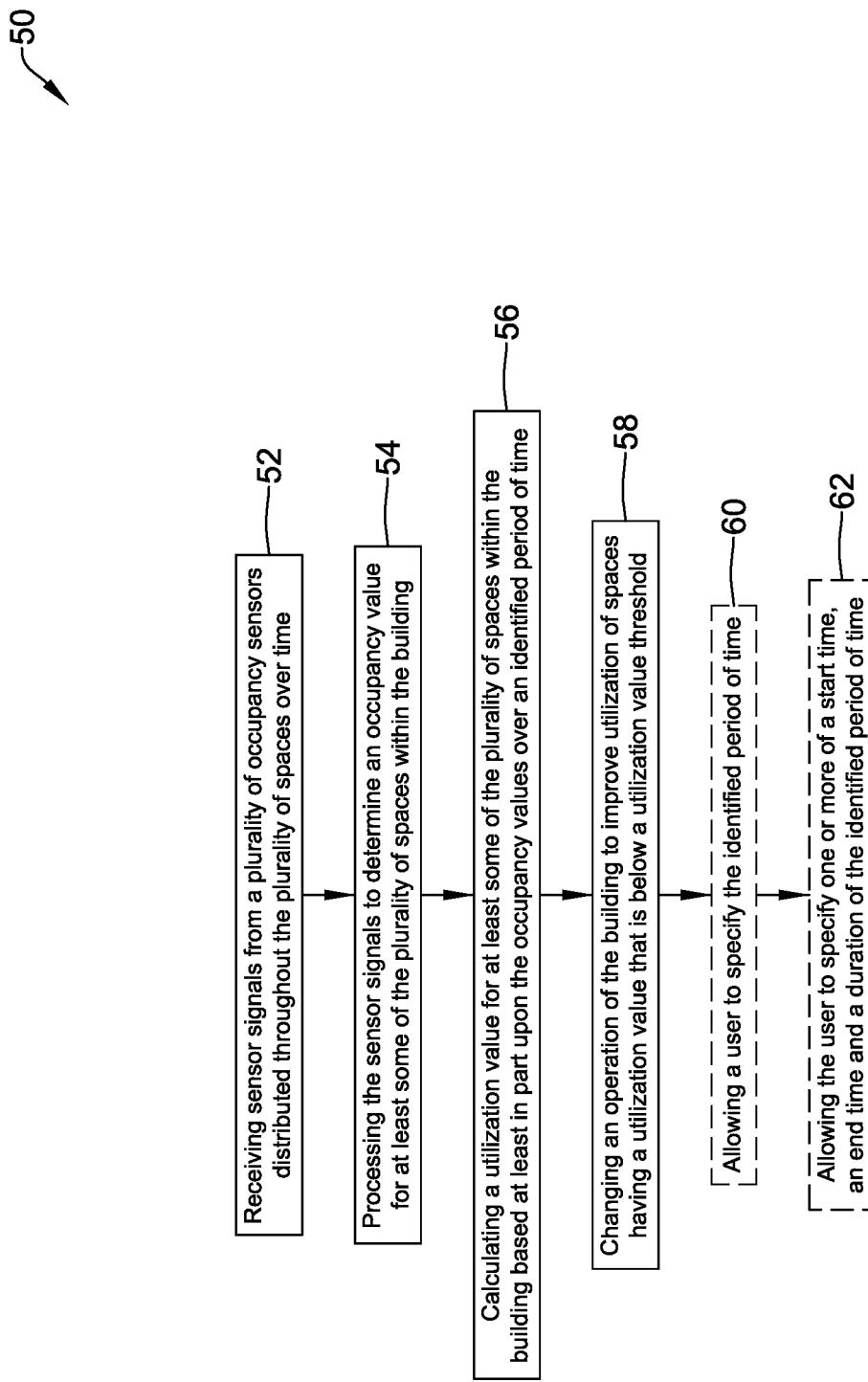
FIG. 3 is a flow diagram showing an illustrative method of improving space utilization within a building.

FIG. 3 is a flow diagram showing an illustrative method 50 of improving space utilization within a building (such as the building 12) having a plurality of spaces (such as the building spaces 16). Sensor signals are received from a plurality of occupancy sensors (such as the sensors 18) that are distributed throughout the plurality of spaces over time, as indicated at block 52. The sensor signals are processed to determine an occupancy value for at least some of the plurality of spaces within the building, as indicated at block 54. A utilization value is calculated for at least some of the plurality of spaces within the building based at least in part upon the occupancy values over an identified period of time, as indicated at block 56. An operation of the building is changed to improve utilization of spaces having a utilization value that is below a utilization value threshold.

Changing the operation of the building, as indicated at block 58, may include redirecting occupants of the building toward spaces of the building that have lower utilization values. In some cases, changing the operation of the building may include moving one or more pieces of equipment from a location that is spaced apart from a number of users of that equipment to a new location in the building that is closer to the number of users of that equipment. In some instances, the user may be allowed to specify the identified period of time, as optionally indicated at block 60. The user may be allowed to specify one or more of a start time, an end time and a duration of the identified period of time, for example, as indicated at block 62.

Figure 4:
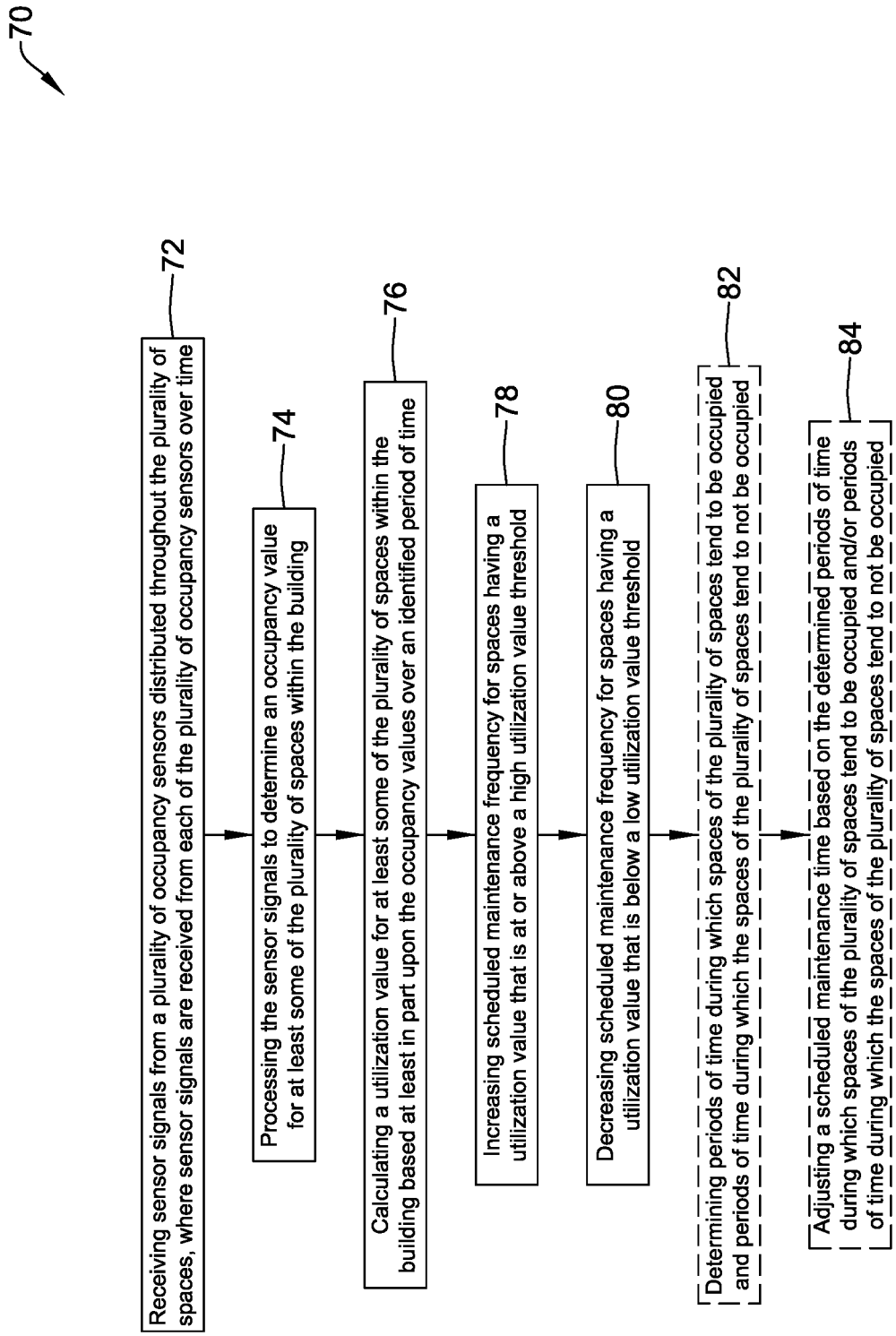
FIG. 4 is a flow diagram showing an illustrative method of improving maintenance within a building.

FIG. 4 is a flow diagram showing an illustrative method 70 of improving maintenance within a building (such as the building 12) having a plurality of spaces (such as the building spaces 16). Sensor signals are received from a plurality of occupancy sensors distributed throughout the plurality of spaces, where sensor signals are received from each of the plurality of occupancy sensors over time, as indicated at block 72. The sensor signals are processed to determine an occupancy value for at least some of the plurality of spaces within the building, as indicated at block 74. A utilization value is calculated for at least some of the plurality of spaces within the building based at least in part upon the occupancy values over an identified period of time, as indicated at block 76. The scheduled maintenance frequency is increased for spaces having a utilization value that is at or above a high utilization value threshold, as indicated at block 78 and is decreased for spaces having a utilization value that is below a low utilization value threshold, as indicated at block 80.

In some cases, periods of time during which spaces of the plurality of spaces tend to be occupied and periods of time during which the spaces of the plurality of spaces tend to not be occupied may be determined, as optionally indicated at block 82. A scheduled maintenance time may be adjusted based on the determined periods of time during which spaces of the plurality of spaces tend to be occupied and/or periods of time during which the spaces of the plurality of spaces tend to not be occupied, as optionally indicated at block 84. Scheduled maintenance may include janitorial cleaning services and/or equipment maintenance for equipment disposed within at least some of the spaces of the plurality of spaces.

Figure 5:
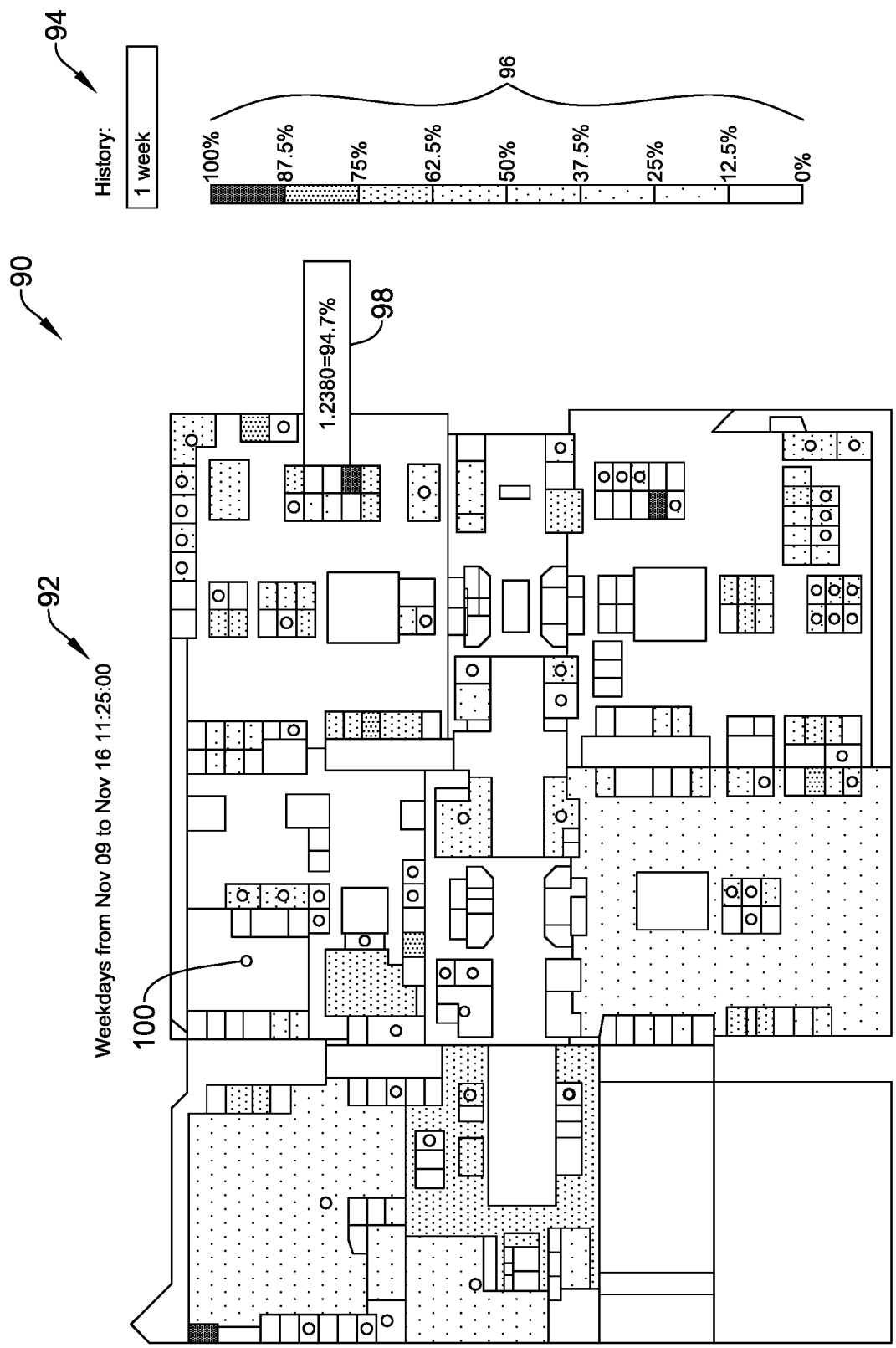
FIG. 5 is a heat map showing an example of occupancy values tracked over time.

FIG. 5 shows a heat map 90 that may be considered as a graphical representation of relative occupancy data for a building space. While the heat map 90 may be considered as showing a number of building spaces 16 that are arranged together, such as on the same floor or level, it will be appreciated that heat maps may be generated for only a few building spaces 16, or may be generated for a substantial portion of a large building, for example. The heat map 90 includes a title 92, that indicates a particular period. The heat map 90 includes a pull-down history menu 94 by which a user may select how long of a time period is of interest. It can be seen that the user has selected one week of history, as shown on the pull-down history menu 94 as well as by the length of the period of time reflected in the title 92. In some cases, the user is allowed to select one or more of a start time, an end time and a duration of the time period is of interest (e.g. identified period of time).

The illustrative heat map 90 includes a legend 96 that shows a particular shading for any relative occupancy value ranging from 100 percent to 0 percent. It will be appreciated that any building space 16 that reflects a relative occupancy value of 100 percent means that that particular building space 16 has been occupied more frequently than any other building space 16 that is not shown as being at 100 percent. It does not necessarily mean that a particular building space 16 has been continuously occupied for the prescribed period of time (one week, from November 9 to November 16, weekdays at 11:25 am). As an example, assume there are two building spaces. One space is occupied twice, the other space is occupied once. The space occupied twice would have an occupancy value of 100 percent while the space occupied only once would have an occupancy value of 50 percent.

In some cases, allowing the cursor to hover over a particular building space 16 may cause additional information to be displayed on the heat map 90. In some instances, the additional information may be superimposed over the heat map 90 as a label 98. The example label 98 identifies the particular building space (space 1-2380, meaning room 2380 on the first floor) and its relative occupancy value of 94.7 percent. This means that space 1.2380 is one of the more heavily occupied spaces, at least for the period of time in question. In some cases, the label 98 may provide the name of the particular space, such as "kitchen", or "north conference room". These are just examples. It is contemplated that the heat map 90 may also include a number of icons 100 are shown on the heat map 90. The icons 100, which as shown are lower case "o's", indicate that a particular space is currently occupied

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of using a computing device to operate a building system within a building that has a plurality of spaces and a plurality of occupancy sensors disposed within at least two or more of the plurality of spaces, the method comprising:
    the computing device receiving occupancy data over time for each of two or more of the plurality of spaces within a building from the occupancy sensors that are disposed within each of the two or more of the plurality of spaces within the building;
    the computing device determining an occupied time for each the two or more of the plurality of spaces based on the received occupancy data;
    the computing device determining a mostoccupied space of the two or more of the plurality of spaces based on the occupied times determined for each the two or more of the plurality of spaces, wherein the most occupied space is the space of the two or more of the plurality of spaces that has the highest occupied time of the two or more of the plurality of spaces;
    the computing device determining an utilization value for each of the two or more of the plurality of spaces, wherein the utilization value represent a proportion of the occupied time of the respective space relative to the occupied time of the most occupied space; and
    the computing device changing an operation of the building system based at least in part on the utilization value of at least one of the plurality of spaces, wherein the building system comprises one or more of an HVAC system, an access controls system and a surveillance system, and changing the operation of the building system comprises changing an operation of the HVAC system, the access controls system and/or the surveillance system that services the building.

2. The method of claim 1, further comprising the computing device outputting one or more recommendations based at least in part on the utilization value of at least one of the plurality of spaces, wherein the one or more recommendations include one or more of a recommendation to change a maintenance schedule for a space and/or a maintenance schedule for equipment in the building, a recommendation to change a current space allocation of the building, and a recommendation to make a physical change in a structure of the building and/or a physical change in a placement of one or more pieces of equipment in the building.

3. The method of claim 1, wherein changing the operation of the building system comprises redirecting occupants of the building toward spaces of the building that have lower utilization values.

4. The method of claim 1, wherein when a space of the plurality of spaces has two or more occupancy sensors providing the occupancy data for that space, the computing device scaling the occupancy data for that space according to the number of occupancy sensors in that space providing the occupancy data.

5. The method of claim 1, further comprising the computing device displaying a heat map showing the determined utilization values for at least some of the plurality of spaces within the building.

6. The method of claim 5, further comprising the computing device displaying a current indication of occupancy for at least some of the plurality of spaces within the building on the heat map based on current received occupancy data.

7. The method of claim 5, further comprising the computing device temporarily superimposing space labels over a particular portion of the heat map when a user hovers a pointer icon over the particular portion of the heat map.

8. The method of claim 1, wherein the most occupied space of the two or more of the plurality of spaces is the space of the two or more of the plurality of spaces that has the highest occupied time of the two or more of the plurality of spaces during an identified period of time, and the utilization value for each of the two or more of the plurality of spaces represents a proportion of the occupied time of the respective space during the identified period of time relative to the occupied time of the most occupied space during the identified period of time.

9. The method of claim 8, further comprising the computing device allowing a user to specify the identified period of time.

10. The method of claim 9, further comprising the computing device allowing the user to specify one or more of a start time, an end time and a duration of the identified period of time.

11. The method of claim 1, wherein at least some of the plurality of spaces within the building comprise one or more of a room, an office, a hallway, a conference room, a restroom and a lunch room.

12. A method of using a computing device to operate a building system within a building that has a plurality of spaces and a plurality of occupancy sensors disposed within at least two or more of the plurality of spaces, the method comprising:
    the computing device receiving occupancy data over time for each of two or more of the plurality of spaces within a building from the occupancy sensors that are disposed within each of the two or more of the plurality of spaces within the building;
    the computing device determining an occupied time for each the two or more of the plurality of spaces based on the received occupancy data;
    the computing device determining a mostoccupied space of the two or more of the plurality of spaces based on the occupied times determined for each the two or more of the plurality of spaces, wherein the most occupied space is the space of the two or more of the plurality of spaces that has the highest occupied time of the two or more of the plurality of spaces;

the computing device determining an utilization value for each of the two or more of the plurality of spaces, wherein the utilization value represent a proportion of the occupied time of the respective space relative to the occupied time of the most occupied space;

the computing device displaying a heat map on a display showing the determined utilization values for at least some of the plurality of spaces within the building; and the computing device changing an operation of the building system based at least in part on the utilization value of at least one of the plurality of spaces, wherein the building system includes one or more of an HVAC system, an access controls system and a surveillance system, and wherein changing the operation of the building system comprises changing an operation of one or more of the HVAC system, the access controls system and/or the surveillance system that services the building.

13. The method of claim 12, further comprising the computing device displaying a current indication of occupancy for at least some of the plurality of spaces within the building on the heat map based on current received occupancy data.

14. The method of claim 12, further comprising the computing device outputting one or more recommendations based at least in part on the utilization value of at least one of the plurality of spaces, wherein the one or more recommendations include one or more of a recommendation to change a maintenance schedule for a space and/or a maintenance schedule for equipment in the building, a recommendation to change a current space allocation of the building, and a recommendation to make a physical change in a structure of the building and/or a physical change in a placement of one or more pieces of equipment in the building.

15. The method of claim 12, further comprising the computing device changing an operation of the building system based at least in part on the utilization value of at least one of the plurality of spaces, wherein changing an operation of the building system comprises redirecting occupants of the building toward spaces of the building that have lower utilization values.

16. The method of claim 12, wherein the most occupied space of the two or more of the plurality of spaces is the space of the two or more of the plurality of spaces that has the highest occupied time of the two or more of the plurality of spaces during an identified period of time, and the utilization value for each of the two or more of the plurality of spaces represents a proportion of the occupied time of the respective space during the identified period of time relative to the occupied time of the most occupied space during the identified period of time.

17. The method of claim 8, further comprising the computing device allowing a user to specify the identified period of time.

18. A non-transitory computer readable medium storing instructions thereon that when executed by one or more processors causes the one or more processors to:

receive occupancy data over time for each of two or more of the plurality of spaces within a building serviced by a building system from one or more occupancy sensors that monitor each of the two or more of the plurality of spaces within the building;

determine an occupied time for each the two or more of the plurality of spaces based on the received occupancy data;

determine a most occupied space of the two or more of the plurality of spaces based on the occupied times determined for each the two or more of the plurality of spaces, wherein the most occupied space is the space of the two or more of the plurality of spaces that has the highest occupied time of the two or more of the plurality of spaces;

determine an utilization value for each of the two or more of the plurality of spaces, wherein the utilization value represent a proportion of the occupied time of the respective space relative to the occupied time of the most occupied space;

output one or more recommendations based at least in part on the utilization value of at least one of the plurality of spaces, wherein the one or more recommendations include oneor more of a recommendation to change a maintenance schedule for a space and/or a maintenance schedule for equipment in the building, a recommendation to change a current space allocation of the building, and a recommendation to make a physical change in a structure of the building and/or a physical change in a placement of one or more pieces of equipment in the building; and change an operation of the building system based at least in part on the utilization value of at least one of the plurality of spaces, wherein the building system comprises one or more of an HVAC system, an access controls system and a surveillance system, and changing the operation of the building system comprises changing an operation of one or more of the HVAC system, the access controls system and/or the surveillance system that services the building.

* * * * *